No. 659,121. Patented Oct. 2, 1900.
E. W. AYRES.
APPLIANCE FOR AUTOMOBILES.
(Application filed June 16, 1900.)
(No Model.) 2 Sheets—Sheet 1.

UNITED STATES PATENT OFFICE.

EDWARD W. AYRES, OF WASHINGTON, DISTRICT OF COLUMBIA.

APPLIANCE FOR AUTOMOBILES.

SPECIFICATION forming part of Letters Patent No. 659,121, dated October 2, 1900.

Application filed June 16, 1900. Serial No. 20,595. (No model.)

*To all whom it may concern:*

Be it known that I, EDWARD W. AYRES, of Washington, in the District of Columbia, have invented a new and useful Improvement in Appliances for Automobiles, of which the following is a specification.

My invention relates to a safety device for automobiles; and it consists in the parts and combinations hereinafter described and claimed.

Figure 1:
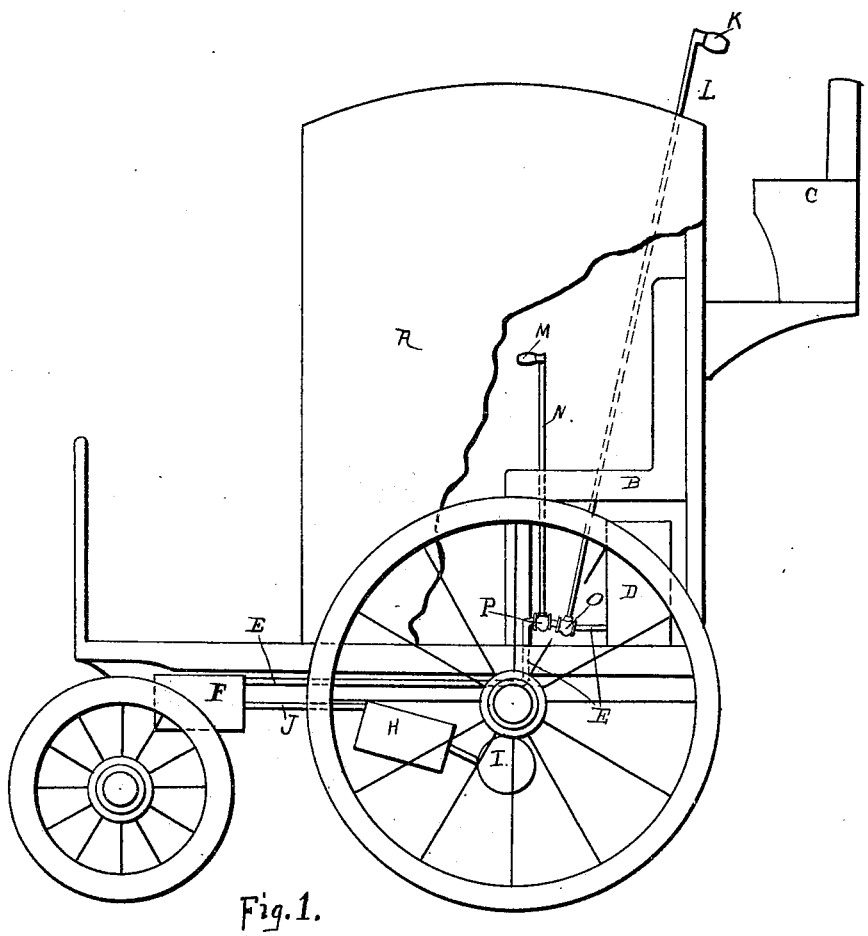
Figure 2:
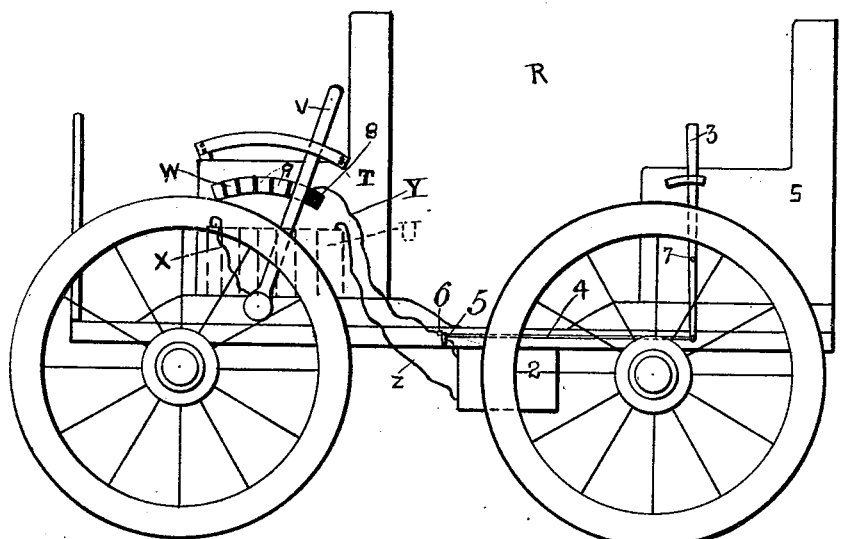

Referring to the accompanying drawings, which form part of this application, Figure 1 is a diagrammatical view of an automobile employing a hydrocarbon-motor. Fig. 2 shows an automobile employing an electric motor.

In automobile vehicles, whatever the motive power employed, there is always provided a device under control of the driver for starting and stopping the vehicle by starting and stopping the motor; but in many types of vehicles the driver's seat is so located that the starting and stopping device arranged accessible to the driver is entirely out of the passengers' reach. Especially is this so in such types of automobiles as cabs, vehicles with two or more seats, &c. Thus the passengers are utterly helpless to stop the vehicle in case of any accident to or negligence on the part of the driver. This has resulted in numerous accidents to passengers in automobiles and has rendered the general public timid about riding in automobile vehicles. The majority of these accidents have occurred through the automobile unaccountably starting while the driver was off his seat or from the driver being thrown from his seat by a jar or sudden swerve of the vehicle.

My invention consists principally in an auxiliary device under control of the passengers and by means of which they can instantly stop the vehicle at any time necessary.

Referring now to Fig. 1, A represents an automobile cab. B is the usual seat for the passengers. C is the driver's seat. D is a reservoir for containing the hydrocarbon fuel. E is a pipe connecting such reservoir with a carbureter or vaporizer F. H is a hydrocarbon-motor geared to the traction-shaft of the vehicle in any well-known manner by the mechanism I. K is a handle under control of the driver for starting or stopping the motor and connected by rod L with the valve O in pipe E. M is a handle located accessible to the passengers and connected by rod N with the valve P in pipe E. J is the usual feed-pipe leading from the carbureter to the motor-cylinder. It will be readily understood that K is the usual means provided to enable the driver to start and stop the motor and that the valve or cock O, operated thereby, controls the supply of hydrocarbon to the carbureter and motor-cylinder. It is equally clear that the passengers can stop the vehicle at any instant by turning the handle M to close valve or cock P, and thereby cut off the supply of hydrocarbon to the carbureter and motor.

Referring to Fig. 2, R represents any common type of two-seated automobile. S is the passengers' seat. T is the driver's seat. U is the storage battery or other source of electrical supply. V is a lever under control of the driver for starting, stopping, and controlling the speed of the automobile. W is a resistance-box or rheostat consisting of the usual conducting-segments 9, separated by insulating material, and of the insulated segment 8. X is a conducting-wire leading from one pole of the battery and electrically connected to the lever V. Y is a conducting-wire properly connecting the rheostat W to the electric motor 2 through the switch 5 and 6. Z is a conducting-wire leading from the other pole of the battery and properly connected to the electric motor 2. 3 is a lever located accessible to the passengers and pivoted to the vehicle-body at 7. 4 is a rod pivoted at one end to the lever 3 and at the other end to the link 5. 5 is a link pivoted at its lower end to the vehicle-body. 6 is a contact-piece which, together with the swinging link 5, constitutes a common form of electric switch. It is clear that the driver can stop the motor at any time by moving the controlling-lever V to bring it over the insulated segment 8 of the rheostat. The passengers can stop the vehicle at any instant by operating the auxiliary lever 3 to open the switch 5 and 6.

While I have shown my invention applied to two well-known types of automobiles, it is obvious that it is capable of application to any type of automobile vehicle.

Having thus described my invention, what

I claim as new, and desire to secure by Letters Patent, is—

1. In an automobile, a motor, a source of motive supply, connections between said motor and supply, a movable device under control of the driver and arranged in one position to interrupt said connections, and an auxiliary movable device located accessible to the passengers and constructed to in one position interrupt said connections and thereby stop the vehicle.

2. In an automobile, a motor, a source of motive supply, connections between said motor and supply, mechanism in said connections and constructed to interrupt such connections, a device connected to said mechanism and under the control of the driver for stopping the motor, a second mechanism arranged in the connections between the motor and the motive supply and constructed to interrupt such connections, an operating-lever located accessible to the passengers and connected to said second mechanism.

In testimony whereof I hereunto set my hand, this 16th day of June, 1900, in the presence of two attesting witnesses.

EDWARD W. AYRES.

Witnesses:
CHAS. G. BUSTO,
MINA G. OLCOTT.